Figure 1:
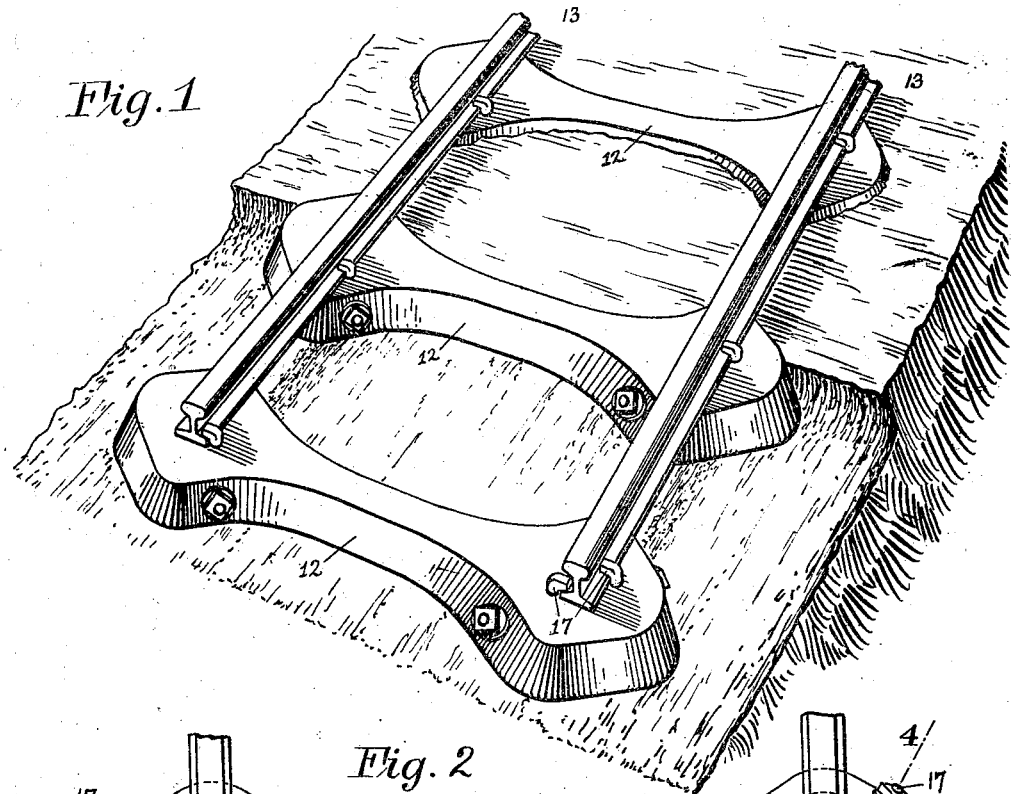

(No Model.) 2 Sheets—Sheet 1.

G. A. OWEN & G. A. BATES.
RAILWAY SLEEPER.

No. 591,565. Patented Oct. 12, 1897.

Witnesses:
William A. Lorenz
Jennie Nellis

Inventors:
G. A. Owen & G. A. Bates
By their Attorney
W. H. Honiss (No Model.) 2 Sheets—Sheet 2.

G. A. OWEN & G. A. BATES.
RAILWAY SLEEPER.

No. 591,565. Patented Oct. 12, 1897.

Witnesses:
William A. Lorenz
Jennie Nellis

Inventors:
G. A. Owen & G. A. Bates
By their Attorney W. H. Honiss

UNITED STATES PATENT OFFICE.

GEORGE A. OWEN, OF SPRINGFIELD, MASSACHUSETTS, AND GEORGE A. BATES, OF BROOKLYN, NEW YORK.

RAILWAY-SLEEPER.

SPECIFICATION forming part of Letters Patent No. 591,565, dated October 12, 1897.

Application filed December 5, 1896. Serial No. 614,560. (No model.)

*To all whom it may concern:*

Be it known that we, GEORGE A. OWEN, residing at Springfield, in the county of Hampden and State of Massachusetts, and GEORGE A. BATES, residing at Brooklyn, in the county of Kings and State of New York, citizens of the United States, have invented certain new and useful Improvements in Railway-Sleepers, of which the following is a full, clear, and exact specification.

This invention relates to new and useful improvements in the construction and arrangement of artificially-manufactured cross-ties or sleepers for railways, the object being to provide a sleeper formed or molded from clay, cement, artificial stone, asphalt, or a composition of these, which in their plastic form may be molded into the desired form and reinforced by metallic loops and ties, thus producing a comparatively inexpensive sleeper which when hardened by baking or burning shall possess the requisite stiffness, strength, and durability. The clay, cement, or other material, which when in its plastic state is adapted to be molded into the forms desired for this purpose, is liable when baked, burned, or otherwise hardened to be brittle, so as to break or crumble too readily under the repeated and severe strains and shocks incident to its use. Nor is its structure suited to receive and retain the bolts required for holding the rails in position thereon, and especially is this true with regard to our improved form of bolt shown herein.

Our present improvements relate chiefly to the means whereby this objectionable feature is obviated by reinforcing the crumbly or brittle structure of the tie by means of metallic rods or stays, thus serving to bind the material together around the rail-holding bolts to hold the structure together longitudinally and incidentally to stiffen it laterally also. In connection with means of reinforcing the structure of the tie we provide holding-bolts of a peculiar form for the track-rails, which, instead of being driven or screwed into or passing transversely through the sleeper, are curved, so as to pass from the holding-flange of the rail downwardly into the sleeper and against the metallic stiffening medium employed, thence by the continuation of its curved form passing out of the side of the sleeper at a point thereof readily accessible to the track-repairers, at which point it is tightened by means of a nut and washer in the usual way.

Figure 2:
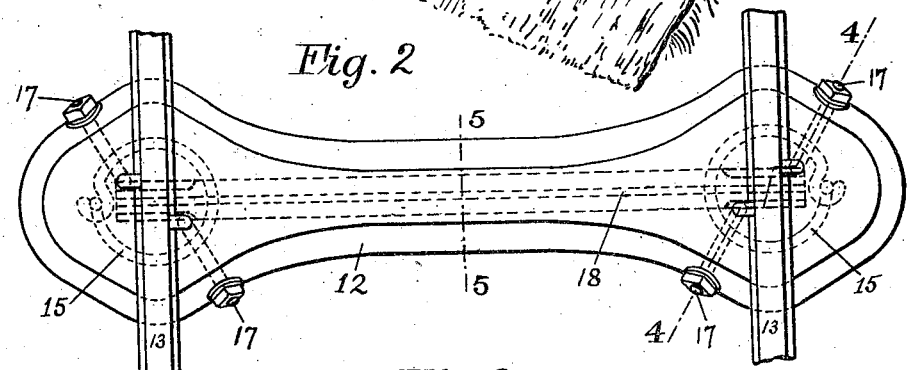
Figure 3:
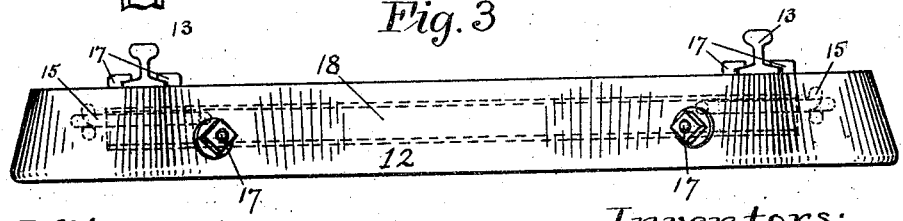
Figure 4:
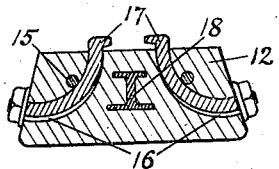
Figure 5:
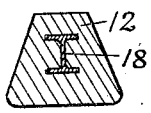
Figure 6:
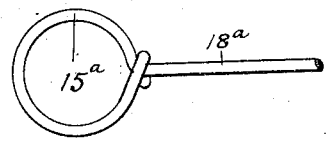
Figure 7:
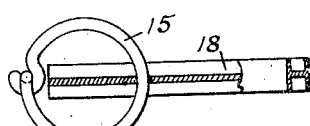
Figure 9:
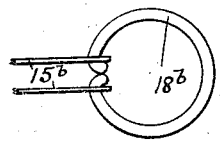
Figure 8:
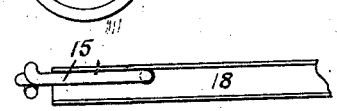
Figure 11:
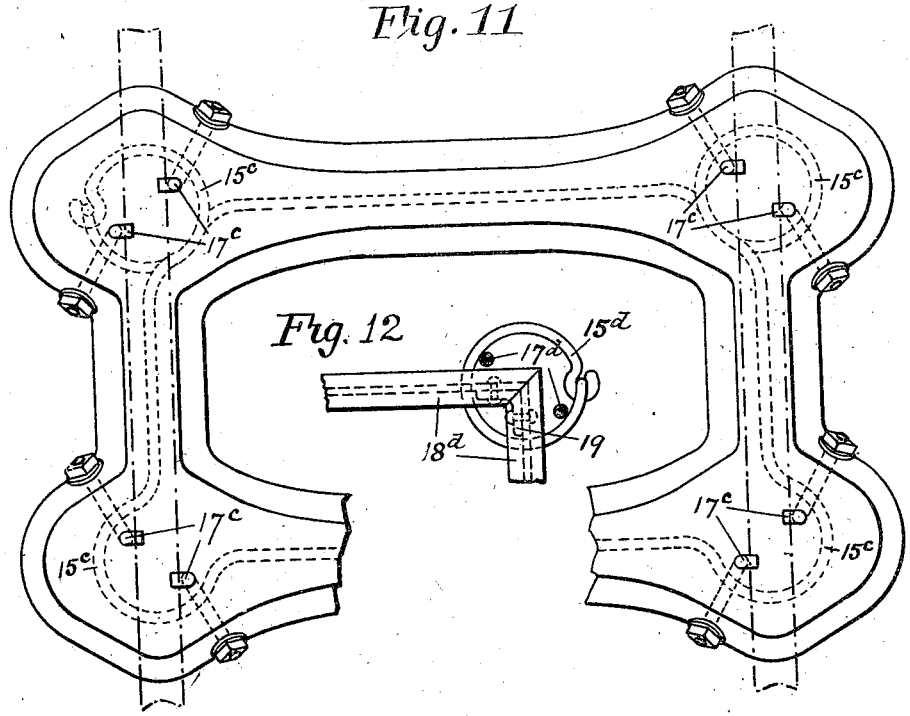
Figure 12:
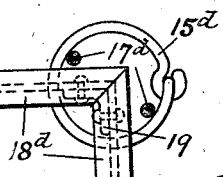

Figure 1 of the drawings is a perspective view representing a section of railway, showing in connection therewith three of our improved ties or sleepers in position, from two of which the ballast has been removed sufficiently to show their form and arrangement. Fig. 2 is a plan view, and Fig. 3 is an edge view, of one of our improved sleepers, showing in dotted lines our preferred form of reinforcing means. Fig. 4 is a view in section taken on the line 4 4 of Fig. 2, showing the form, arrangement, and relation of our improved rail-holding bolts in connection with the sleeper and with the stiffening or reinforcing means thereof. Fig. 5 is a cross-sectional view taken on the line 5 5 of Fig. 2, showing the I-beam which is therein employed as the connecting and stiffening reinforcing means. Fig. 6 shows a modified form of our means for reinforcing the sleeper. Fig. 7 is a plan view, and Fig. 8 an edge view, showing in detail the arrangement of our preferred means for reinforcing the sleeper. Fig. 9 is a plan view, and Fig. 10 a side view, of a modified arrangement of our sleeper-reinforcing means, wherein two flat plates are employed in place of the I-beam shown in Figs. 5, 7, and 8. Fig. 11 is a plan view illustrating the manner in which two or more of our improved dies or sleepers may be integrally combined so as to reinforce each other and so as to extend the area of the rail-support. Fig. 12 is a plan view illustrating our preferred method of constructing the metallic portion of each of the corners of the structure shown in Fig. 11.

Those portions of the sleeper 12 upon which the rails 13 rest and through which the rail-bolts pass are reinforced by means of the loops 15, which encircle and bind together the material adjacent to those portions of the structure which are subject to the greatest strain when in use. The recesses 16 for the curved bolts 17 extend from the upper surface of the sleeper downwardly and outwardly toward the side faces of the sleeper, passing just within the circle of the loops 15. These bolts and the recesses therefor describe substantially an arc of ninety degrees or a little more, according to the angle which the side of the tie makes with its upper surface, emerging therefrom at the side of the tie, as shown clearly in Figs. 2 and 4. This arc form of the bolt, in connection with the circumstance that the vertical plane of its position is inclined away from the longitudinal position of the rail, enables it to be slipped readily into its place even when the rail is in position. This inclination of the vertical plane of the bolt also serves to carry the nut away from the side of the rail to a position readily accessible to the wrenches employed for tightening or loosening the nut. As the nut is tightened the bolt is drawn in the lengthwise direction of the arc described by it, the tendency to lateral displacement being met by that portion of the material of the sleeper which is on its inner side reinforced by the metallic loop 15.

The loops 15 are preferably formed of round iron rods of about seven-eighths of an inch diameter bent into circular form with their ends hooked together, as shown in Figs. 2 and 7. They are also connected together longitudinally of the sleeper, preferably by means of the metallic I-beam or girder 18, each end of the web of the girder being provided with a hole through which the loops 15 are passed. These loops and their connecting tie-rod or girder are necessarily placed in the sleeper while the latter is in its plastic state, thus being closed upon all sides by the material of which the sleeper is composed, which if sufficiently impermeable to moisture protects the metal against corrosion. The curved recesses 16 for the bolts are also preferably formed in the sleeper by means of cores while the latter is in its plastic condition. The lower ends of these recesses at the sides of the sleeper are preferably elongated in a vertical direction only, as shown in Fig. 4, in order to enable the curved bolts to be readily pushed to place even when the short threaded portion of the bolt is made straight, as it should be, instead of conforming to the curvature of the remainder thereof.

Figure 10:
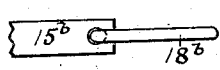

In the modified form of our invention shown in Fig. 6 the loop 15$^a$ of our reinforcing-rod is made integral with the cross-tie member 18$^a$ thereof, while in the modification shown in Figs. 9 and 10 the cross-tie members 18$^b$ consist of two flat plates provided at their ends with holes through which the ends of the loops 15$^b$ are passed, those ends being slightly turned so as to form hooks which prevent the accidental withdrawal or disconnection thereof. This form of loop may be manufactured in the form shown and may be readily hooked to place just before inserting in the mold.

The modification shown in Fig. 11 consists of two of our improved sleepers arranged side by side, the four loops 15$^c$ being formed of a single piece of rod the reaches of which connect them together both laterally and longitudinally of the track-rails. The loops shown in the upper of the two ties are formed of a complete coil of rod, while in the lower tie the rods are looped to a sufficient extent to enable them to entirely encircle and support the bolts 17$^c$, the latter form being preferable. This form and arrangement of the tie-rods is comparatively inexpensive and is sufficiently strong for light traffic; but in the employment of a plurality of sleepers thus joined together longitudinally of the track-rails in situations where the traffic is very heavy we prefer the I-beam form of reinforcing tie-rods or girders shown in Figs. 7 and 8, joining them at the angles in the manner shown in Fig. 12, in which the I-beams 18$^d$ are mitered or otherwise jointed and are firmly secured together by means of the angle-plate 19, riveted or bolted to each of them. In this arrangement the loops 15$^d$ are passed through each of the I-beams forming the angle, the track-bolts 17$^d$ coming outside of that angle. It is obvious that any desired number of cross members may thus be united by other members running longitudinally of the track-rails, reinforced by means of rods or girders in any one of the ways herein set forth.

Our improved sleepers form a satisfactory substitute for the present wooden ties or sleepers, which because of the increasing scarcity of timber are becoming more and more expensive. They also require frequent renewal owing to the rapidity with which they decay, so that in the long run our improved sleepers are comparatively inexpensive, taking into account their relative durability and permanence.

We claim as our invention—

1. A railway-sleeper composed of material molded to shape while in a plastic state, having embedded therein metallic loops encircling those portions of the sleeper which form the seats for the rails, and for the rail-bolts, the loops being connected by means of a beam of I-section, also embedded in the interior of the sleeper, whereby it serves to connect the two loops, and to stiffen the sleeper against lateral strains, substantially as described.

2. A rail-bolt provided with a head or lip for engaging with the rail-flange, and having a body portion curved in substantially the arc of a circle, the rail-engaging lip of the bolt being turned at an angle with the plane of the curve of its body, substantially as described.

3. In combination with a railway-sleeper, a rail-bolt therefor, having its curved body substantially in the arc of a circle, having at one end a head or lip for engaging with the rail, and having at its opposite end a screw-threaded portion, the sleeper being provided with a correspondingly-curved passage or recess for the bolt, whereby the bolt-head may project from the upper or rail surface of the sleeper, with its opposite or threaded end projecting from the side surface of the sleeper for receiving a nut, substantially as described.

4. In combination with a railway-sleeper, a rail-bolt therefor, having a head or lip for engaging with the rail, and having its body curved in the arc of a circle, the sleeper being provided with a correspondingly-curved passage or recess for the bolt, whereby the bolt enters the upper or rail surface of the sleeper and emerges from the side surface thereof, the vertical plane of the curved passage in the sleeper being at a substantial angle to the vertical plane of the rail, for the purpose specified.

5. A composition railway-sleeper having metallic reinforcing-loops surrounding and binding together the portions thereof which form the seats for the rails and their bolts, the sleeper being provided with curved passages for the rail-bolts leading from the rail-surface, and extending in a curve therefrom to the side surface of the sleeper, passing within the metallic reinforcing-loops.

6. A rail-supporting structure consisting of a plurality of members located transversely of the rails at the desired distance apart, and connected by members running longitudinally of the rails, the structure being formed of material molded while in plastic condition, having metallic loops surrounding the portions thereof which receive the rail-bolts, the loops being connected both longitudinally and laterally of the track-rails by means of metallic cross-ties, substantially as described.

7. A rail-supporting structure consisting of a plurality of members located transversely of the rails at the desired distance apart, and connected by members running longitudinally of the rails, the structure being formed of material molded while in plastic condition, and reinforced by metallic loops, surrounding the portions thereof which receive the rail-bolts, the loops being connected both longitudinally and laterally of the track-rails by means of metallic beams of I-section embedded in the interior of the plastic material, serving to connect the metallic loops, and to stiffen the structure both laterally and longitudinally of the track-rails, substantially as described.

GEORGE A. OWEN.
GEORGE A. BATES.

Witnesses to G. A. Owen:
  JENNIE H. THOMPSON,
  WALTER MUIR.

Witnesses to G. A. Bates:
  GEO. C. RIDER,
  W. P. BURBAGE.